(12) United States Patent
Griffin et al.

(10) Patent No.: US 10,505,723 B1
(45) Date of Patent: Dec. 10, 2019

(54) SECRET SHARING INFORMATION MANAGEMENT AND SECURITY SYSTEM

(71) Applicant: Wells Fargo Bank, N.A., San Francisco, CA (US)

(72) Inventors: Phillip H. Griffin, Raleigh, NC (US); Jeffrey J. Stapleton, O'Fallon, MO (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 287 days.

(21) Appl. No.: 15/498,377

(22) Filed: Apr. 26, 2017

(51) Int. Cl.
| | | |
|---|---|---|
| *H04L 29/06* | (2006.01) | |
| *H04L 9/08* | (2006.01) | |
| *H04L 9/14* | (2006.01) | |
| *H04L 9/30* | (2006.01) | |
| *H04L 9/32* | (2006.01) | |

(52) U.S. Cl.
CPC ............ *H04L 9/085* (2013.01); *H04L 9/14* (2013.01); *H04L 9/30* (2013.01); *H04L 9/3247* (2013.01); *H04L 2209/72* (2013.01)

(58) Field of Classification Search
CPC ... H04L 9/085; H04L 9/30; H04L 9/14; H04L 9/3247; H04L 2209/72
USPC ........................................................ 713/176
See application file for complete search history.

(56) References Cited

U.S. PATENT DOCUMENTS

| | | | |
|---|---|---|---|
| 5,708,714 A | * | 1/1998 | Lopez .................. H04L 9/085 713/180 |
| 8,050,409 B2 | | 11/2011 | Agrawal et al. |
| 8,108,678 B1 | | 1/2012 | Boyen |
| 8,713,329 B2 | | 4/2014 | Schneider |
| 8,726,019 B2 | | 5/2014 | Paddon et al. |
| 8,774,410 B1 | | 7/2014 | Juels |
| 8,995,657 B2 | | 3/2015 | Nagai et al. |
| 9,027,149 B2 | | 5/2015 | Koike |
| 9,049,010 B2 | | 6/2015 | Jueneman et al. |
| 9,124,423 B2 | | 9/2015 | Jennas et al. |
| 9,130,744 B1 | | 9/2015 | King et al. |
| 9,166,972 B2 | | 10/2015 | Maeda et al. |

(Continued)

OTHER PUBLICATIONS

Laura Savu; Schnorr Signcryption; University of Bucharest, Romania; Feb. 2012) (Year: 2012).*

(Continued)

*Primary Examiner* — Shin-Hon (Eric) Chen
(74) *Attorney, Agent, or Firm* — Foley & Lardner

(57) ABSTRACT

Various embodiments relate to a method of receiving an original message, share-holder list, and threshold amount. The original message is tokenized resulting in a tokenized message. A plurality of shares are generated from the tokenized message using a message sharing algorithm of a secret sharing scheme. Each of the plurality of shares is signcrypted using a public key and a private key associated with the shared secret provider computing system and a public key of a respective one of the share-holders included in the share-holders list, resulting in a plurality of signcrypted shares. The plurality of signcrypted shares is distributed to the respective ones of the share-holders according to the public key used to signcrypt the respective signcrypted share. The authenticity and data integrity of each of the plurality of signcrypted shares can be determined by using the public key associated and a public/private key pair associated with the share-holder.

22 Claims, 4 Drawing Sheets

(56) References Cited

U.S. PATENT DOCUMENTS

| | | | |
|---|---|---|---|
| 9,338,147 B1 | 5/2016 | Rothstein et al. | |
| 9,407,431 B2 | 8/2016 | Bellare et al. | |
| 9,430,655 B1* | 8/2016 | Stockton | G06F 21/602 |
| 10,084,596 B1* | 9/2018 | Triandopoulos | H04L 51/30 |
| | | | 713/168 |
| 2001/0037453 A1* | 11/2001 | Mitty | H04L 51/30 |
| | | | 713/168 |
| 2005/0111657 A1* | 5/2005 | Lee | H04L 9/085 |
| | | | 380/28 |
| 2011/0216903 A1 | 9/2011 | Curabet et al. | |
| 2015/0229480 A1* | 8/2015 | Joye | H04L 9/008 |
| | | | 713/176 |
| 2016/0300234 A1 | 10/2016 | Moss-Pultz et al. | |
| 2016/0033027 A1 | 11/2016 | Ebrahimi | |
| 2017/0005797 A1* | 1/2017 | Lanc | H04L 9/0894 |
| 2017/0353855 A1* | 12/2017 | Joy | H04W 12/02 |

OTHER PUBLICATIONS

Margaret Rouse; Digital Signature; Tech Target; Nov. 2014 (Year: 2014).*

Jun Hosoi; What is a Time Stamp?; Global Sign; Feb. 2017 (Year: 2017).*

Hash Function; Wikipedia; Feb. 2017 (Year: 2017).*

Butoi et al., "Secret sharing scheme for data confidentiality preserving in a public-private hybrid cloud storage approach", 2014 IEEE/ACM 7th International Conference on Utility and Cloud Computing. 6 pages.

Chang et al., "Meaningful secret sharing technique with authentication and remedy abilities", Information Sciences 191, 2011. 12 pages.

Changgen et al., Threshold Signcryption Scheme Based on Elliptic Curve Cryptosystem and Verifiable Secret Sharing, Proceedings, 2005 International Conference on Wireless Communications, Networking and Mobile Computing, 2005, vol. 2, IEEE. 4 pages.

Ham et al., "Authenticated Group Key Transfer protocol Based on Secret Sharing", IEE Transactions on Computers, vol. 59, No. 6, Jun. 2010. 5 pages.

ISO/IEC JTC 1/SC 27, Text for ISO/IEC FDIS 19592-1—Information Technology—Security Techniques—Secret sharing—Part 1: General, Jun. 22, 2016. 18 pages.

ISO/IEC JTC 1/SC 27, Text for ISO/IEC DIS 19592-2—Information technology—Security techniques—Secret sharing—Part 2: Fundamental mechanisms, May 17, 2016. 36 pages.

Lin et al., "Secret Image Sharing with Steganography and Authentication", Journal of Systems and Software, vol. 73, Issue 3, Nov.-Dec. 2004. 10 pages.

ANSI X9.73/2010,"Cryptographic Message Syntax—Asn.1 and XML", Apr. 15, 2010. 89 pages.

ANSI X9.95/2011, "Trusted Time Stamp Management and Security", Sep. 2010. 150 pages.

BSI Standards Publication, "Information Technology—Security Techniques—Signcryption", 2011. 64 pages.

ITU-T, X.509, "Series X: Data Networks, Open System Communications and Security", Oct. 2012. 208 pages.

* cited by examiner

US 10,505,723 B1

SECRET SHARING INFORMATION MANAGEMENT AND SECURITY SYSTEM

BACKGROUND

A secret sharing scheme is a cryptographic technique used to protect the confidentiality of a message by dividing it into a number of pieces called shares. A secret sharing scheme has two main parts: a message sharing algorithm for dividing the message into shares and a message reconstruction algorithm for recovering the message from all of or a subset of the shares. Secret sharing can be used to store sensitive information (e.g., confidential data), authentication credentials (e.g., passwords) or cryptographic materials (e.g., cryptographic keys) securely in distributed systems or similar systems. A secret sharing scheme involves three roles: a dealer, at least two share-holders, and the receiver. The dealer is the party that has a message and executes the message sharing algorithm. The dealer generates a plurality of shares that are responsive to a determined threshold. The threshold is the minimum number of shares needed to be received by the receiver in order to recover the original message out of the total outstanding shares (the maximum threshold). After operating the sharing algorithm on the message to obtain the shares, the dealer distributes the shares to the share-holders. The receiver is the party attempting to reconstruct the message. When the receiver wants to learn the message, it collects shares from an authorized set of share-holders and assembles the shares to pass through the message reconstruction algorithm. If enough shares are available to reconstruct the original message, then the receiver recovers the message by executing the message reconstruction algorithm. The receiver may collect additional shares past the threshold. Note that dealers and receivers are typically programmed hardware or software entities, and not humans, whereas share-holders are typically humans employing various media such as paper, smartcards, or USB sticks.

SUMMARY

Various embodiments relate to a method of receiving, by a shared secret provider computing system, an original message, a share-holder list, and a threshold amount. The original message is tokenized, resulting in a tokenized message. A plurality of shares are generated from the tokenized message using a message sharing algorithm of a secret sharing scheme. Each of the plurality of shares is signcrypted using a public key and a private key associated with the shared secret provider computing system and a public key of a respective one of the share-holders included in the share-holders list, resulting in a plurality of signcrypted shares. The plurality of signcrypted shares is distributed to the respective ones of the share-holders according to the public key used to signcrypt the respective signcrypted share. The authenticity and data integrity of each of the plurality of signcrypted shares can be determined by each of the share-holders using the public key associated with the shared secret provider computing system and a public/private key pair including the public key associated with the respective one of the share-holder. The original message can be recovered when the threshold amount of the distributed plurality of signcrypted shares are received from the share-holders.

Various other embodiments relate to a method of receiving, by a shared secret provider computing system, an original message, a share-holder list, and a threshold amount. The original message is tokenized resulting in a tokenized message. A plurality of shares are generated from the tokenized message using a message sharing algorithm of a secret sharing scheme. Each of the plurality of shares is digitally signed using a private key of a public/private key pair associated with the shared secret provider computing system, resulting in a plurality of digitally signed shares. The plurality of digitally signed shares is distributed to each of respective ones of the share-holders according to share-holder list. The authenticity and data integrity of each of the plurality of digitally signed shares can be determined by each of the share-holders using a public key of the public/private key pair. The original message can be recovered when the threshold amount of the distributed plurality of digitally signed shares are received from the share-holders.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Figure 1:
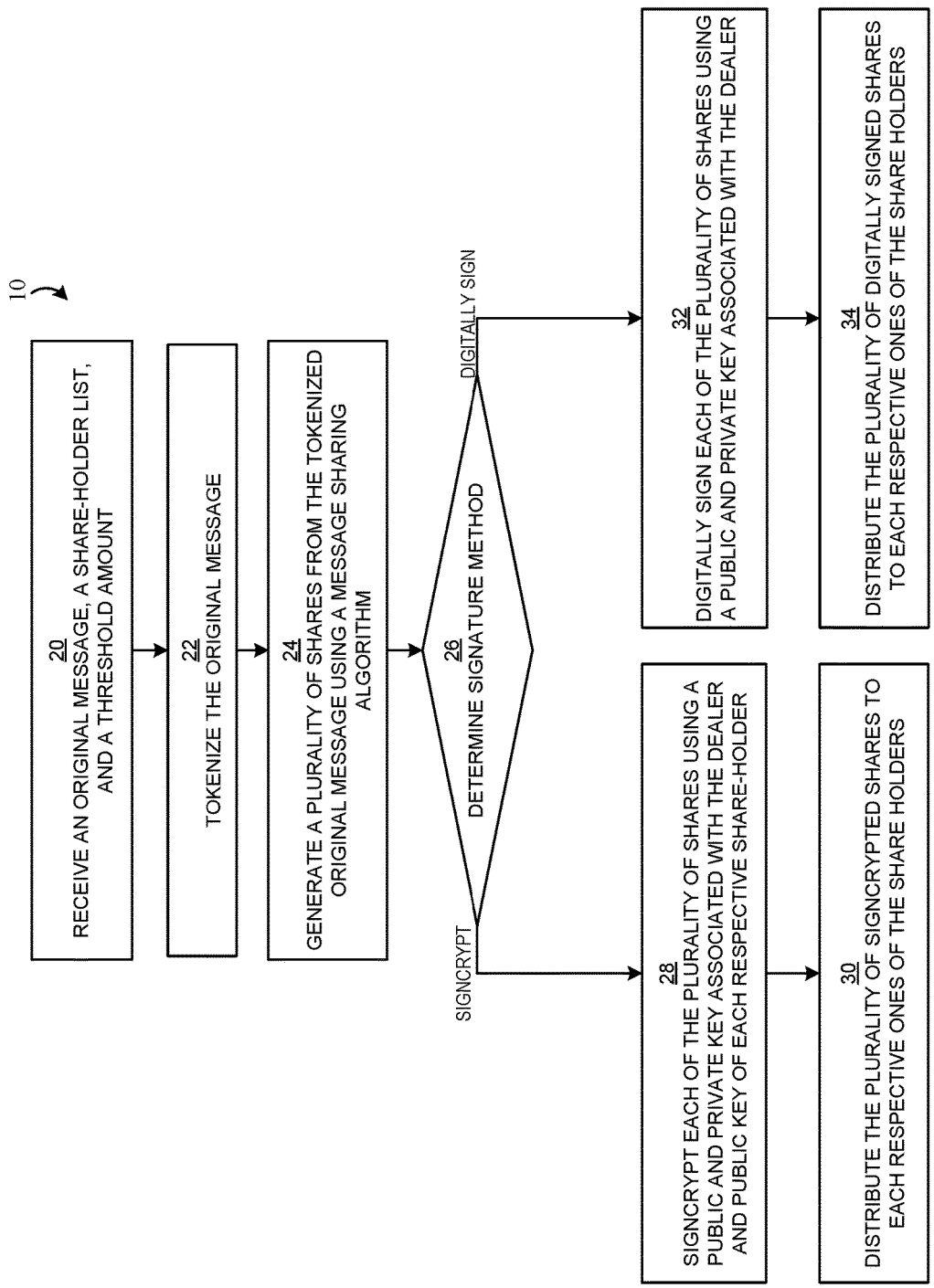
FIG. 1 is a flow diagram of a method of generating a secret sharing information management and security ("SSIMS") shares, according to an example embodiment.

Current secret sharing schemes provide confidentiality for the original message input to the sharing process. However, the current processes does not provide data integrity, origin authenticity, or confidentiality services for the generated shares. Accordingly, the generated shares are limited in use, functionality, and security because the generated shared cannot be safely recorded in a security event journal, distributed to one or more "share-holders," or stored securely for later use without risk of compromise. For example, under the current secret sharing schemes, if a third-party may intercepts one or more generated shares, they could potentially reconstruct the original message. Additionally, the chain of custody and integrity of each generated share is at times unknown or difficult to verify under current secret sharing schemes. Shares are typically stored on removable media, such as smartcards or USB tokens, but there is a lack of understanding on how to manage such devices that could be easily lost or stolen. Accordingly, many financial institutions use or require the use of paper-based secret key distribution mechanisms in order to protect the shares—by keeping them off a network—and to monitor the keys from generation to reconstruction by providing physical security in the form of guards or key monitors to follow the paper shares.

Referring generally to the figures, systems, and methods, the SSIMS system is used to generate SSIMS shares that are protected by tokenization and signcryption. In some embodiments, the SSIMS system utilizes cryptographic keys, associated keying materials (e.g., initialization vectors), and original messages as input to a secret share creation process. When an original message is received by a dealer (e.g., in some instances a secret share provider as described herein) to be input to the secret sharing process, the data in the message is first tokenized and securely stored for later retrieval by the dealer. Next, the secret share creation process uses the tokenized data to generate secret shares to be distributed to a group of share-holders (e.g. the parties to which the shares of the original message are to be transmitted). Subsequently, the shareholders provide the secret shares to a reconstructing entity (e.g., the original dealer) and the secret shares are used as inputs to the reconstruction process to recover the original message only if a threshold number of secret shares are received by the reconstructing entity.

The SSIMS system provides data integrity, origin authenticity, confidentiality, and non-repudiation services for information in a secret sharing system. The SSIMS system makes use of several of the secure messages in the X9.73 Cryptographic Message Syntax ("CMS") standard, either separately or in combination, to manage the security of the information in a secret sharing system. The SSIMS leverages the CMS messages to support the active monitoring of operations of the SSIMS system. Monitoring includes securely logging events in support of risk management, security policy compliance, and governance activities. As will be appreciated, these activities may occur in a distributed ledger (e.g., a blockchain) or cloud environment. The SSIMS system's underlying secret sharing mechanisms are based on cryptographic techniques that can be automated and are preferred to the paper-based secret key distribution mechanisms commonly used in many financial institutions.

By using a tokenization schema to protect the original message and/or the shares, the SSIMS system provides additional security because a share-holder—and therefore any third-party that may acquire the share—would need to detokenize a share in order to recover the share. The tokenization services may be provided by a remote tokenization service provider ("TSP"). Inn some arrangements, the tokenization schema utilized by the TSP is one described in the Abstract Syntax Notation One ("ASN.1") Tokenized-Data type defined in the X9.73 CMS standard, and is used to provide confidentiality services in a secret sharing system. Accordingly, tokenized original messages and generated shares are suitable for placing in a system event log.

Signcryption is a hybrid cryptographic primitive that utilizes a combination of an asymmetric encryption scheme and a digital signature scheme, along with specially developed algorithms, to perform both encryption and digital signature functions simultaneously. This efficient cryptographic technique provides data integrity, origin authentication, and data confidentiality in a single operation. Some versions of signcryption algorithms provide non-repudiation. By utilizing signcryption, the SSIMS system protects the confidentiality and data integrity of the original message and shares during transfer and storage. According to various embodiments, any of the following three SigncryptedData processing modes are used for secure share distribution: (1) the signcrypted-content processing mode is used to signcrypt an entire value of any ASN.1 type that contains one or more shares; (2) the signcrypted-attribute processing mode is used to signcrypt an entire value of any ASN.1 type that contains one or more shares along with any associated attributes of any type; and (3) the signcrypted-components processing mode is used to signcrypt a specific set of one or more secret shares embedded in a value of any ASN.1 type. Alternatively, in some embodiments, the SSIMS system uses digital signatures in place of signcryption to generate the SSIMS shares.

These embodiments abrogate the issues with the current security and storage ecosystems because the use of the specific tokenization techniques and signcryption protect both the original message and shares during transfer and while at rest. The SSIMS system allows for storage in a distributed ledger and the subsequent audit and compliance checks of the various activities (e.g., generation, reconstruction, etc.) with the SSIMS shares. The SSIMS system provides verifiability. The SSIMS shares are verifiable because they contain auxiliary information that allow share-holders to verify that the shares are correct, allowing for successful reconstruction. Before reconstruction, either share-holders or the receiver can use this auxiliary information to check for the correctness of the shares. In some arrangements, the SSIMS system provides a mechanism for verifying that sharing is consistent by adding auxiliary information to the shares that is used to verify the correctness of the reconstructed message but not the shares used in the reconstruction process. The SSIMS system also provides confidentiality. The SSIMS is informationally-theoretically confidential because it maintains message confidentiality regardless of the computational power of an unauthorized coalition of shareholders that are trying to access the message. The SSIMS system is computationally confidential because it guarantees confidentiality against an unauthorized coalition with unlimited computational capabilities through several levels of information-theoretic confidentiality that can be distinguished.

Further, the methods and systems described herein alleviate the strain on processing power and memory components currently required to manage, store, and reconstruct shares. Embodiments described herein utilize a less strenuous processing method through a specific tokenization system and signcryption technique used to generate and transmit shares securely. The tokenization and signcryption schemas provide enhanced values that are sent to system monitoring tools. The further application of authenticity and integrity enhancements to these values would make them more valuable during system assessments and security audits. Processing power is also alleviated by the use of globally-unique information object identifiers ("OIDs") and signed attributes to identify the processing algorithm used or the original message. For example, in some embodiments a SSIMS share includes in an attribute that is a hash of the original message and is easily discernable through the OIDs. Therefore, SSIMS systems reduce the processing power and memory storage requirements necessary to authenticate that SSIMS shares and the original message.

Referring to FIG. 1, a flow diagram of a method 10 of generating SSIMS shares is shown, according to an example embodiment. The method 10 is described in connection with a dealer generating a plurality of SSIMS shares and distributing them to the share-holders. The dealer can be an entity that operates a dealer computing system 102 of FIG. 2. The share-holder can be an entity that operates a share-holder computing system 106 of FIG. 2. The method 10 can also be in performed by other computing systems, such as the receiver computing system 108 of FIG. 2. The method 10 is shown in regard to generating a plurality of signcrypted or digitally signed SSIMS shares.

The method 10 begins at 20 when the dealer receives an original message, a share-holder list, and a threshold amount. The original message is of any format or content, such as a confidential file that is to be divided into a number of shares. The share-holder list specifies the parties to which the shares of the original message are to be transmitted. The original message is able to be divided into any finite number of shares. In some arrangements, a share-holder may receive more than one share. For example, in order to conduct a vote, an "Approve" string is the original message divided into five shares for four share-holders, with one share-holder receiving two shares, and therefore two votes. The threshold amount is the number of shares that are needed to successfully reconstruct the original message. For example, if a secret sharing scheme supports thresholds, it might be instantiated to share the message into n shares with a threshold k where 2≤k≤n. In such a setting, any k shares are sufficient for a successful completion of the message reconstruction algorithm. In other words, the access structure consists of all k-subsets of shares (all subsets of cardinality k). For example, in conducting the vote, the threshold may be three of the five outstanding shares, signifying a simple majority.

At 22, the original message is tokenized. The dealer transmits the original message to a TSP that returns the tokenized original message. In some arrangements, prior to tokenization, the original message is digitally signed, encrypted, signcrypted, or enhanced using a MAC or HMAC technique. In some arrangements, the original message results are hashed for input to a trusted Time Stamp Authority ("TSA"), and the resulting Time Stamp Token ("TST") is included in the input to the tokenization process.

At 24, a message sharing algorithm is used to generate a plurality of SSIMS shares from the tokenized original data. The message sharing algorithm can include an information dispersal algorithm, a Shamir secret sharing scheme, a Ramp-Shamir secret sharing scheme, an additive secret sharing scheme, or a computational secret sharing scheme.

At 26, a signature method is determined, either signcrypted at 28 or digitally signed at 32. The determination of a signature method can depend on the desires of the entity requesting the generation of the SSIMS or may be dealer specific. As will be appreciated, the use of signcrypting or digitally signing the SSIMS shares both have benefits and draw backs that can affect the determination. For example, signcryption affords greater security (through the additional encryption) than digitally signing, whereas digitally signing is less process intensive (due to the lack of encryption) than signcryption. In some arrangements, the plurality of SSIMS shares are tokenized using a TSP to provide further confidentiality of the generated SSIMS shares. In some arrangements, the generation of the SSIMS shares can prompt the generation of an event journal entry. The event journal can be reviewed at any time to determine if the generation was complete and accurate. The event journal does not contain any share data, only share tokens that can be detokenized.

At 28, the plurality of shares are signcrypted using a public and private key associated with the dealer and a public key associated with each of the respective shareholders. The signcryption process includes using a signcryption algorithm to simultaneously bind and encrypt the SSIMS share along with any additional information that the dealer wants to provide, either under the signcryption or under a signature in a signed attribute. The signcryption algorithm takes as input a plaintext SSIMS share, a dealer's public and private key pair, and a share-holder's public key, and performs a sequence of specified operations on the input to output the ciphertext in the form of a signcrypted SSIMS share. As will be appreciated, each SSIMS share must be signcrypted separately, with each signcryption algorithm using the share-holder public key associated with the specific SSIMS share in the plurality of SSIMS shares. In some arrangements, a TST may be associated with sets of one or more shares and input to the signcryption process, or included as SigncryptedData attributes. Such TSTs may be used for any purpose specified by a dealer, including providing assurance to a third party of the share creation time or validity.

In some arrangements, the input also includes a label and an option. The plaintext SSIMS share, the label, and the resulting signcrypted SSIMS shares are all bit strings. The public and private keys and the option are determined by the particular implementation of an SSIMS system mechanism (e.g., SSIMS-content, SSIMS-attributes, and SSIMS-components modes). The label is a bit string that participates in the signcryption of a plaintext but need not be protected for confidentiality. An example of a label is a string of public data that is either explicit or implicit from context and required to be bound to an SSIMS share. The length of a label may be variable, upper-bound only by an implementation dependent parameter. The same label is required to be used by both the signcryption and unsigncryption algorithms in order for a relying party to correctly unsigncrypt an SSIMS share. In some arrangements, the label is an empty field. The option is an input argument that passes application- and mechanism-specific information to signcryption and unsigncryption algorithms. While information transmitted by an option may be used in signcryption or unsigncryption, the option itself is not directly involved in the signcryption or unsigncryption process. Unlike the label, the option used by the receiver party's unsigncryption algorithm may be different from an option used by the unsigncryption algorithm. For example, the elliptic curve based signcryption mechanism defined in the International Standard ISO IEC 29150-2011 may use an option to indicate the desired format for encoding points on an elliptic curve. In some arrangements, the option is used to pass system wide parameters specific to the signcryption mechanism. In other arrangements, the option is used to pass application- or mechanism-specific information, such as private factors of composite moduli, to aid faster signcryption or unsigncryption. In some arrangements, the option is an empty field.

In some arrangements, information about how the original message is reconstructed from its secret shares is included in the using the secure SigncryptedData or in either of the SigncryptedData attribute fields. This share reconstruction information may be in the form of a Uniform Resource Identifier whose query string includes the location of the dealer performing the reconstruction service and an indicator of, the name of a share set being submitted for reconstruction, and a set of one or more shares. Instructional or dealer contact information for the shares recipient may also be included.

In some arrangements, an attribute is included in the SignedAttributes field of the SigncryptedData message named originalMessageHash. This originalMessageHash attribute contains a value of CMS type DigestedData as its payload. The DigestedData payload contains the hash of the original message from which the shares were derived. In some embodiments, the hash (message digest) is used as a database or Directory index to allow shares to be quickly associated with the original message from which the shares were derived. This association allows share dealers or holders to locate and retrieve documents and shares and manage the reconstruction requirements associated with an original message.

An original message hash attribute is represented by an originalMessageHash information object of class ATTRIBUTE defined as follows:

```
originalMessageHash ATTRIBUTE ::= {
    WITH SYNTAX          OriginalMessageHash
    ID                   id-OriginalMessageHash
}
id-OriginalMessageHash OID ::= { 1 2 3 4 }
OriginalMessageHash ::= DigestedData
```

Type DigestedData consists of a message digest algorithm identifier and optional associated parameters, such as a message content type identifier and optional associated content, and a cryptographic hash of the identified content. In the case of the originalMessageHash attribute, the optional associated content is not present. It is anticipated that the message content type will be ordinary data and not a nested CMS type.

In some embodiments, the SignedcryptedData content component contains a list of secret shares defined as follows:

SecretShares ::=SEQUENCE SIZE(1 . . . MAX) OF Share

Share ::=OCTET STRING

For SigncryptedData to be most useful, the hash should be available in the signed attributes component rather than in the signcrypted content. Tokenization is used to protect a set of secret shares rather than relying on encryption techniques. In one embodiment, a set of tokenized shares to be signcrypted in the SigncryptedData message content component is defined as follows:

```
TokenizedSecretShares ::= SEQUENCE SIZE(1..MAX) OF
TokenizedShare
TokenizedShare ::= SEQUENCE }
    tSP TokenServiceProvider OPTIONAL,
    token Token
}
TokenServiceProvider ::= QueryString
QueryString ::= UTF8String SIZE(1..MAX)
Token ::= OCTET STRING
```

Each tokenized share in the list of values in a value of type TokenizedSecretShares contains one tokenized secret share, and optionally, the location of the TSP where the tokenized secret share is detokenized. ASN.1 types TokenServiceProvider and QueryString are defined in the proposed X9.73 module TokenizationManifest. When the SigncryptedData message is used, it may be convenient to signcrypt the original message associated with the secret shares in the SigncryptedData content component and to use the following signed attribute to bind the associated tokenized secret shares to the original message using the following attribute:

tokenizedSecretShares ATTRIBUTE ::={
        WITH SYNTAX TokenizedSecretShares ID id-TokenizedSecretShares
    }

Expanding on the different signcryption modes, various embodiments utilize any of several modes to generate the signcrypted SSIMS shares, including an SSIMS-content mode, an SSIMS-attributes mode, and an SSIMS-components mode. In the SSIMS-content mode, data content of any type is signcrypted. In the SSIMS-attributes mode, data content and associated attributes of any type or format are signcrypted. In the SSIMS-components mode, components of the data content of any type are signcrypted, and then the resulting content is signed along with a set of associated attributes. This mode allows a SSIMS share containing signcrypted components to be cryptographically bound to a set of security attributes using a digital signature.

In the SSIMS-content mode, content of any type or format is signcrypted using the signcryption algorithm, which the dealer then applies to signcrypt the content using the public and private keys of the dealer and the public key of the share-holder. These keys are identified in the message along with the signcryption results. The plaintext content is not carried in a component of SSIMS-content; only the signcrypted content is available to the message share-holder. The share-holder uses the provided signcryption algorithm, the public key of the dealer, and their own public-private key pair to verify the signature and recover the plaintext from the message. In other words, the signcryption algorithm takes as input a plaintext content, a dealer's public and private key pair, a share-holder's public key and other data and outputs a ciphertext (e.g., the SSIMS) after performing a sequence of specified operations on the input. The message share-holder (whose public key was used as an input) uses the unsigncryption algorithm of the SSIMS to retrieve the plaintext. The unsigncryption algorithm has inputs of the received SSIMS, the share-holder's public and private key pair, a dealer's public key and any other data and outputs a pair consisting of either a symbolic value ACCEPT and a plaintext or a symbolic value REJECT and the null string.

In the SSIMS-attributes mode, content of any type or format is signcrypted together with any number of attributes of any type or format. For the SSIMS-attributes mode, the result of concatenating the attributes to the content is signcrypted by the dealer. The signcryption process for the SSIMS-attributes is the same as the signcryption process for the SSIMS-content mode; the dealer applies this algorithm to signcrypt the content using the public and private keys of the dealer and the public key of the share-holder. The plaintext content and attributes are not included in the message. However, with the SSIMS-attribute mode, there is a value of a type for attributes that are to be signcrypted with the content and placed in the signature component of the SSIMS. The SSIMS-attributes mode can contain an optional attributes component type that is not included in the signcrypted message.

In the SSIMS-components mode, components of content of any type or format are signcrypted as described for the signcrypted-content mode. The resulting content, containing signcrypted components together with at least two required attributes (e.g., the Message Digest and Content Type), is then signed following the processing requirements for the signcrypted data. A list of signcrypted components must be included in the signed attributes to ensure they are bound to the content under a digital signature and available to the intended message share-holder. In some arrangements, an attribute ("Signcrypted Parts") is designated and must be included in the signed attributes to ensure that the attribute is bound to the content under the digital signature. The Signcrypted Parts attribute carries a value of an ASN.1 Open Type that is based on a parameterized type of manifest, where the manifest sets the elements in the information object that constrains the components of the Signcrypted Parts attribute. Any number of objects can be added to the manifest object set, and these objects can be used to locate signcrypted components in a document or file of any type. In some arrangements, a manifest attribute which indicates that the entire content is signcrypted in signcrypted-components mode is utilized, and any attributes are signed and bound to the signcrypted content. These bound attributes are present in the message, but they are not signcrypted.

With any of the SSIMS modes, a list of signcrypted components can be carried in a signed attribute. The format and the information contained in the list varies with the type of content. XML Path ("XPath") expressions can be used to locate any signcrypted element in any XML-instance document. To identify the signcrypted components in an XML-instance document, a set of XPath expressions is used to identify the location of each signcrypted element. When the contents of an XML element are signcrypted, the dealer includes the outer markup tags in the signcryption operation. These outer tags are not removed from the document because they are used to locate the element using XPath. The markup between these outer tags is replaced with a character string representation of the signcryption results (e.g., a value of XML type base64Binary). This XML type may be used to represent arbitrary Base64-encoded binary data. A message share-holder uses the list of XPath expressions to locate the tags in an XML-instance document that contains signcrypted data. The signature on each signcrypted object can then be verified and its plaintext content recovered. The recovered plaintext can then be used to replace the cryptogram with the recovered XML markup prior to XML schema validation. For example, one element is of a type "XPath" and is used to locate any signcrypted element in any XML instance document, or an element in a financial transaction based on the ISO 20022 Universal Financial Industry message scheme. This is beneficial for instances where the contents of an XML element are signcrypted and the dealer includes the outer markup tags in the signcryption.

At 30, the plurality of signcrypted SSIMS shares are distributed to each respective share-holder in accordance with the share-holder list received at 20. The authenticity and data integrity of each of the plurality of signcrypted shares can be determined by each of the share-holders using the public key associated with the dealer and a public/private key pair associated with the respective share-holders.

At 32, the plurality of shares are digitally signed-instead of being signcrypted-using a private key associated with the dealer. The digital signature process includes generating a hash of the content-to-be-signed (e.g., SSIMS share) using a hash algorithm. In some arrangements, attributes that are protected under the signature on the content-to-be-signed may be included in a component of the digital signature. These signed attributes can serve the same function in an identity management context as "signed claims" or "signed assertions" provided using X.509 Attribute Certificates or XML SAML assertions. In other arrangements, the attributes are created by using an OID associated with the original message or secret sharing scheme.

In some arrangements, the digital signature of the SSIMS shares is completed using the ASN.1 type SignedData. In those arrangements, an attribute, named originalMessageHash, is included in the SignedAttributes field of SignedData message. This originalMessageHash attribute contains a value of CMS type DigestedData as its payload. The DigestedData payload contains the hash of the original message from which the shares were derived. The hash (message digest) could be used as a database or Directory index to allow shares to be quickly associated with the original message from which the shares were derived. This association allows share dealers or holders to locate and retrieve documents and shares and manage the reconstruction requirements associated with an original message.

An original message hash attribute is represented by an originalMessageHash information object of class ATTRIBUTE defined as follows:

```
originalMessageHash ATTRIBUTE ::= {
    WITH SYNTAX         OriginalMessageHash
    ID                  id-OriginalMessageHash
}
id-OriginalMessageHash OID ::= { 1 2 3 4 }
OriginalMessageHash ::= DigestedData
```

Type DigestedData consists of a message digest algorithm identifier and optional associated parameters, a message content type identifier and optional associated content, and a cryptographic hash of the identified content. In the case of the originalMessageHash attribute, the optional associated content is not present. It is anticipated that the message content type will be ordinary data and not a nested CMS type.

In some arrangements, the SignedData content component contains a list of secret shares defined as follows:
   SecretShares ::=SEQUENCE SIZE(1 . . . MAX) OF Share
   Share ::=OCTET STRING For SignedData, a hash identifier of the original message could be included directly in the content component to be signed, instead of the hash being carried as a signed attribute, using the following definition:

```
SharePackage ::= SEQUENCE {
    originalMessageHash     DigestedData,
    secretShares            SecretShares
}
```

At 34, the plurality of digitally signed SSIMS shares are distributed to each respective share-holder in accordance with the share-holder list received at 20. The authenticity and data integrity of each of the plurality of digitally signed shares is determined by each of the share-holders using the public key associated with the dealer public/private key pair.

Figure 2:
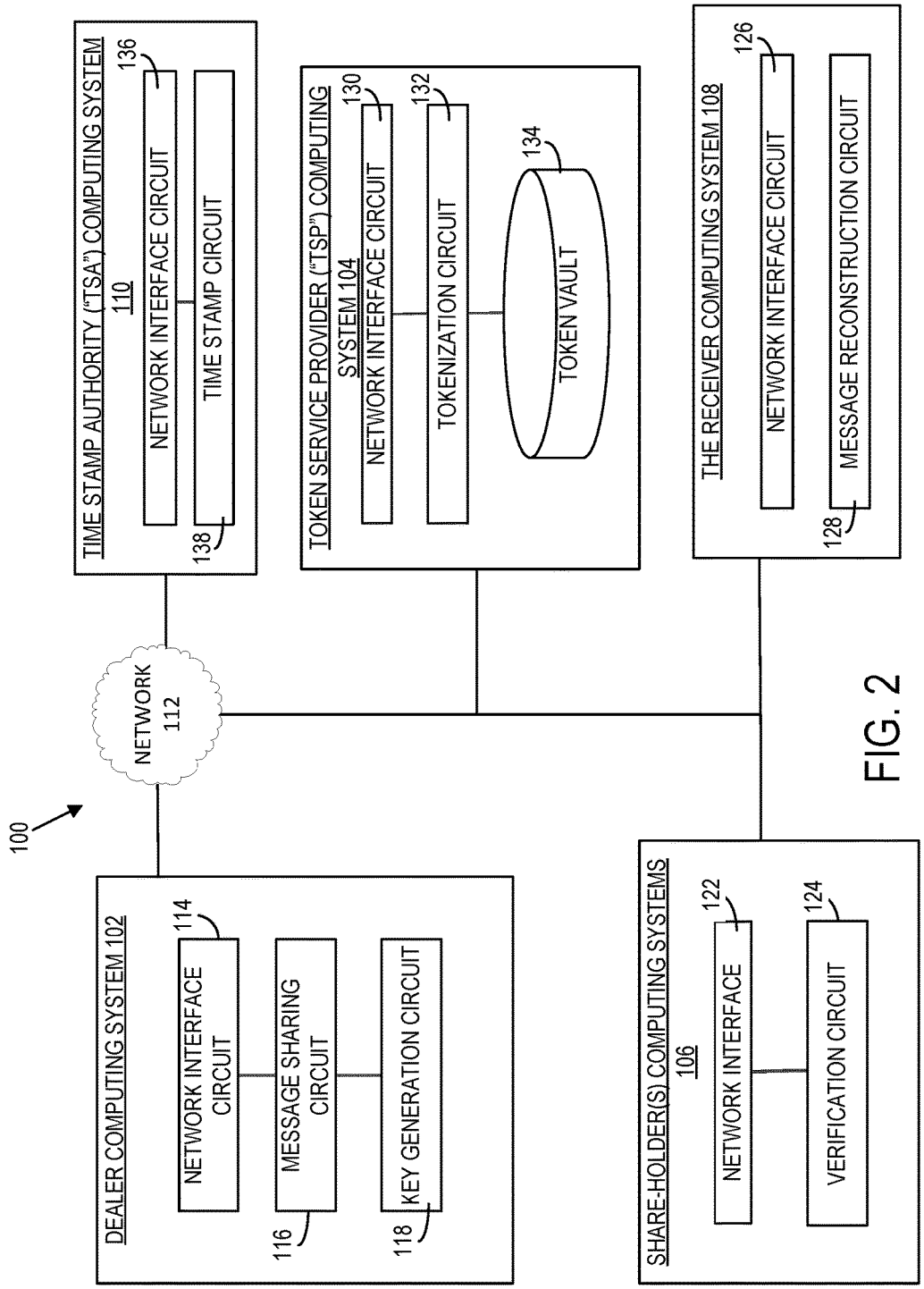
FIG. 2 is a schematic diagram of a SSIMS system, according to an example embodiment.

Referring to FIG. 2, a schematic diagram of a SSIMS system 100 is shown, according to an example embodiment. The SSIMS system 100 includes a dealer computing system 102, a TSP computing system 104, one or more share-holders computing systems 106, a receiver computing system 108, and a TSA computing system 110. Each of the dealer computing system 102, the TSP computing system 104, one or more share-holders computing systems 106, the receiver computing system 108, and the TSA computing system 110 is in operative communication with the others via a network 112. The network 112 may include, for example, the Internet, cellular networks, proprietary banking networks, and the like.

Generally, the SSIMS system 100 is used to generate a plurality of signcrypted or digitally signed shares from an original message, facilitate distribution of the plurality of shares to the share-holders, and reconstruct the original message upon receipt of a threshold amount of the plurality of shares. Although various embodiments are described in connection with users of financial systems, it should be understood that the systems and methods described herein may similarly be used to provide secret sharing in any type of system, such as enterprise security and other types of systems. While the dealer computing system 102, the TSP computing system 104, one or more share-holders computing systems 106, the receiver computing system 108, and the TSA computing system 110 are shown as separate entities in FIG. 2, in some embodiments the dealer computing system 102 performs some of or all of the functions of the receiver computing system 108, as described herein. In some embodiments, one or both of the dealer computing system 102 and the receiver computing system 108 are managed and operated by a financial institution. However, in other embodiments, one or both of the dealer computing system 102 and the receiver computing system 108 are managed and operated by a third-party that is external to a financial institution.

The dealer computing system 102 includes a network interface circuit 114, a message sharing algorithm circuit 116, and a key generation circuit 118. Generally, the dealer computing system 102 is structured to generate and distribute the SSIMS shares. The dealer computing system 102 may, for example, include one or more servers each with one or more processors configured to execute instructions stored in a memory, send and receive data stored in the memory, and perform other operations to implement the secret sharing schemes described herein. The network interface circuit 114 is structured to facilitate operative communication between the dealer computing system 102 and other systems and devices over the network 112.

The message sharing circuit 116 is structured to receive an original message, generate the SSIMS shares, and distribute the SSIMS shares. The message sharing circuit 116 is in communication with the TSP computing system 104 to tokenize one or more data elements in the SSIMS share generation process. The message sharing circuit 116 is also structured to digitally sign one or more data elements in the SSIMS share generation process using one or more key pairs generated by the key generation circuit 118. The SSIMS share generation is described in greater detail above in method 10 of FIG. 1.

The key generation circuit 118 is structured to generate one or more key pairs for use in the SSIMS share generation method and, in signcrypted SSIMS shares, retrieve each share-holders public key of each share-holder's respective key pair. Generally, the key generation circuit 118 retrieves a public/private key pair associated with a digital certificate in a PKI, for example the X.509 certificate. In those arrangements, a key pair is generated (the private/public key pair must be generated together as they are mathematically related), the private key signs the public key, and the pair is summited to the certificate authority ("CA") or the front end registration authority that will then generate that public key certificate. Alternatively, the private/public key pair is issued with a commercial CA, for example one associated with a financial institution. In some arrangements, the key generation circuit 118 retrieves a public key certificate from the commercial certificate authority and uses the certificate to ascertain the public/private key pair. In other embodiments, the key generation circuit 118 generates an ephemeral public/private key pair not associated with a digital certificate in a PKI. In these arrangements, the public key is included in the attributes of the SSIMS share, allowing a digital signature verifier to use the included public key component to verify message integrity. In these arrangements, the verifier will be able to verify message integrity (e.g., that it has not been modified) but will not gain origin authenticity assurance (e.g., know who signed the message and who possessed the private key component of the key pair). In regard to a signcrypted SSIMS share, the key generation circuit 118 is also structured to retrieve a public key certificate for each of the share-holder's respective private keys. This may include a request to each of the share-holders computing systems 106 for each share-holder's respective public keys. In other arrangements, the key generation circuit 118 will look up the share-holder's public key certificate registered with a CA.

The TSP computing system 104 includes a network interface circuit 130, a tokenization circuit 132, and a token vault 134. The TSP computing system 104 may, for example, include one or more servers each with one or more processors configured to execute instructions stored in a memory, send and receive data stored in the memory, and perform other operations to implement the financial services described herein associated with the processing modules, databases, and processes. In some embodiments, some or all of the TSP computing system 104 is managed by the dealer computing system 102.

The network interface circuit 130 is structured to facilitate operative communication between the TSP computing system 104 and other systems and devices over the network 112.

The tokenization circuit 132 is structured to organize and facilitate the tokenization (e.g., obfuscating the cleartext with a token) of any original messages, plurality of shares, or other data used in the generation of SSIMS shares that is received. This includes tokenizing and detokenizing the original message from the dealer computing system 102. In some arrangements, the tokenization circuit 132 may provide an OID with the tokenized data returned to the dealer computing system 102 for inclusion in the tokenized original message. For example, the OID could represent a TSP identifier, tokenization schema, or other information to assist the TSP computing system 104 in processing a tokenization request from the dealer computing system 102. In some arrangements, the dealer computing system 102 may transmit a detokenization request with the original message to the TSP computing system 104. In some arrangements, the tokenization circuit 132 may capture an OID (e.g., either as a signed attribute or included in the template) with the original message from the dealer computing system 102.

The token vault 134 is structured to store the tokens and tokenization schemas that the TSP has implemented to tokenize data. In some arrangements, the token vault 134 includes the plaintext data associated with the generated token.

The share-holder computing system 106 includes a network interface circuit 122 and a verification circuit 124. The share-holder computing system 106 may, for example, include one or more servers each with one or more processors configured to execute instructions stored in a memory, send and receive data stored in the memory, and perform other operations to implement the financial services described herein associated with the processing modules, databases, and processes. The network interface circuit 122 is structured to facilitate operative communication between the share-holder computing system 106 and other systems and devices over the network 112.

The verification circuit 124 is structured to verify the digital signature of a received SSIMS share and provide authenticity and data integrity of the received SSIMS share. The verification process is described in greater detail below in reference to method 300 of FIG. 3.

The receiver computing system 108 includes a network interface circuit 126 and a message reconstruction circuit 128. Generally, the receiver computing system 108 is structured to reconstruct the original message upon receipt of a threshold amount of SSIMS shares in the plurality of SSIMS shares outstanding. The receiver computing system 108 may, for example, include one or more servers each with one or more processors configured to execute instructions stored in a memory, send and receive data stored in the memory, and perform other operations to implement the financial services described herein associated with the processing modules, databases, and processes. The network interface circuit 126 is structured to facilitate operative communication between the receiver computing system 108 and other systems and devices over the network 112.

The message reconstruction circuit 128 is structured to reconstruct the original message from received shares of the distributed plurality of SSIMS shares. Once the threshold amount of shares is reached, the message reconstruction circuit 128 transform the shares into the tokenized message using a message reconstruction algorithm of the secret sharing scheme. This reconstruction process is described in greater detail below in method 400 of FIG. 4. The message reconstruction circuit 128 can also be structured to facilitate the detokenization of the reconstructed original message with the TSP computing system 104.

The TSA computing system 110 includes a network interface circuit 136 and a time stamp circuit 138. The TSA computing system 110 is managed by any trusted time authority that can provide a TST for a piece of information or data entry. The trusted time authority can be one that complies with the X9.95 standard, or those defined in similar standards by ISO/IEC, and satisfies legal and regulatory requirements. In some embodiments, the TSA computing system 110 may be contained in, and controlled by, the TSP computing system 104 or the dealer computing system 102. The network interface circuit 136 is structured to facilitate operative communication between the TSA computing system 110 and the other computing systems over the network 112. The time stamp circuit 138 is structured to negotiate a trusted TST, which includes receiving a hash of a piece of information and generating a trusted TST for the information for future verification. In some arrangements, the TST is stored as an attribute in an SSIMS share, either within the signcryption algorithm as an input or within an SSIMS share as an unsigned attribute that may have been previously signed.

Figure 3:
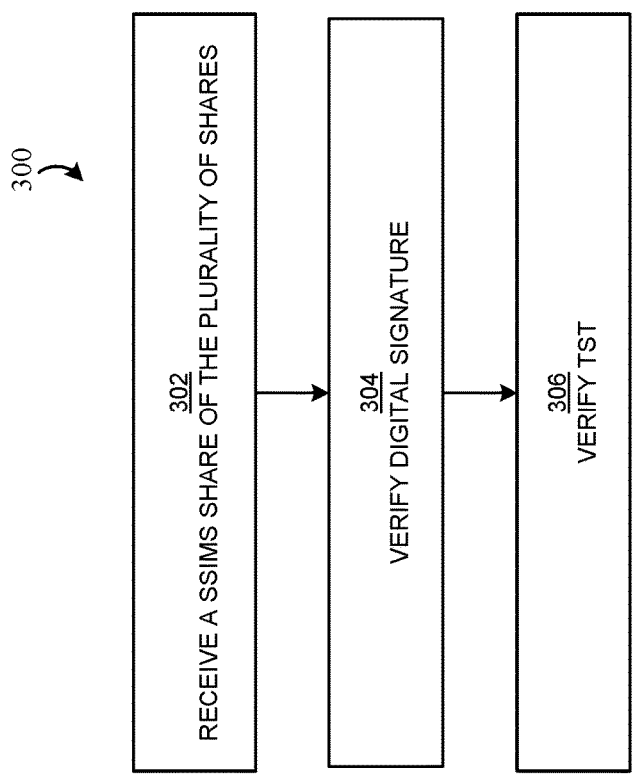
FIG. 3 is a flow diagram of a method of verifying the SSIMS shares, according to an example embodiment.

Referring to FIG. 3, a flow diagram of a method 300 of verifying the SSIMS shares is shown, according to an example embodiment. The method is described in connection with a share-holder receiving an SSIMS share from a dealer. The share-holder can be an entity that operates one of the share-holder computing systems 106 of FIG. 2. The dealer can be an entity that operates the dealer computing system 102 of FIG. 2. The method 300 can also be in performed by other computing systems, for example, the receiver computing system 108 of FIG. 2. The method 300 begins at 302 when the share-holder receives the SSIMS share.

At 304, the digital signature is verified. Generally, verification includes a path validation being performed on the signer (e.g., dealer) certificate chain back to a trust anchor. The share-holder determines whether the message and signed message digest (the "digital signature") that was sent to the share-holder is valid and trusted (e.g., that the signature itself is valid and that the certificates in the path are not on a revocation list). The share-holder can apply the same hash function to the received message to produce a message digest. In arrangements where the SSIMS share is digitally signed, verification includes generating a cryptographic hash of the content (e.g., a share of the tokenized message) identified in the SSIMS share. This hash is signed using the signer's public key signature algorithm and any additional parameters. If the signature is valid, the result will be the same as the value carried in the SSIMS share. In some arrangements, the share-holder examines a public key component to verify message integrity but is unable to get origin authenticity assurance. If signature fails, the share-holder can reject authenticity of the received SSIMS Share.

In arrangements where the SSIMS share is signcrypted, the share-holder can simultaneously verify the signature on the message content and recover the plain text from the signcrypted cipher text. The details of this process depend on the signcryption processing mode specified in the SigncryptedData message. Generally, the verification procedure uses the dealer's public key in a mathematical operation to determine whether the signature was indeed created by the same message digest using the correct private key. If the verification function is successful, the signed version of the message digest will be proven to have originated from the message digest that the recipient has produced by applying the hash function directly to the message. A successful verification operation therefore allows the recipient to confirm the true authorship of the message and to confirm that the message has not been altered. In some arrangements, an SSIMS share includes PKI, CRLs, CA, or similar information for the share-holder computing system 106 to track the signature back to a trusted anchor/entity. For example, the share-holder computing system 106 verifies that the public key certificate is valid with the public or private service provider associated with the key pair used. In other arrangements, the share-holder may use dealer's public key and the share-holder's public and private key to verify the signature.

At 306, the TST is verified by completing a "hash check" with the information. This process includes generating a hash of the original data, appending the timestamp given by the TSA, and calculating the hash of the result (the hash of the original data with the appended time stamp). The digital signature of the TSA on the TST is validated by checking that the signed hash provided by the TSA was indeed signed with the TSA private key by digital signature verification. The hash check is compared to the hash inside the signed TSA message to confirm they are equal, proving that the timestamp was issued by the TSA and that the message is unaltered. If they are not equal, then either the timestamp was altered or the timestamp was not issued by the TSA.

Figure 4:
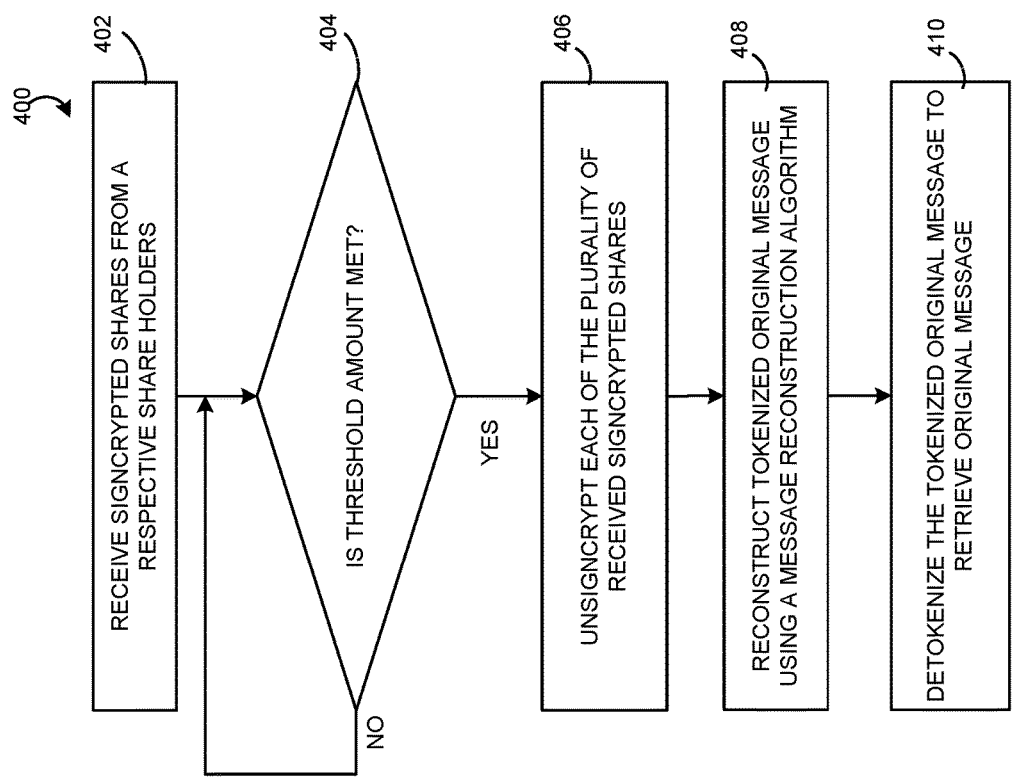
FIG. 4 is a flow diagram of a method of reconstructing the SSIMS shares, according to an example embodiment.

Referring to FIG. 4, a flow diagram of a method 400 of reconstructing the SSIMS shares is shown, according to an example embodiment. The method can be used in conjunction with method 10 of FIG. 1 to reconstruct the original tokenized message from the generated SSIMS shares. The method 400 is described in connection with a receiver receiving a plurality of SSIMS shares from the share-holders. The receiver can be an entity that operates one of the receiver computing systems 108 of FIG. 2. The share-holder can be an entity that operates the share-holder computing system 106 of FIG. 2. The method 400 can also be in performed by other computing systems, such as the dealer computing system 102 of FIG. 2. The method 400 is shown in regard to receiving a plurality of signcrypted SSIMS shares. As will be appreciated, the method 400 of reconstructing the SSIMS shares can also be used to reconstruct a SSIMS share under any digital signature method, for example under a SignedData message.

The method 400 begins when the receiver receives a signcrypted SSIMS share at 402. In some arrangements, the receiver examines the signcrypted SSIMS share, verifies the signature, and returns a verification message to the share-holder that indicates the share-validity verification results and the correctness method used for verification. The returned verification message might be or include a Security Assertion Markup Language ("SAML") assertion. The SAML assertion may be in the form of the SAML attribute defined in X9.73 CMS standard, or in some other format. In some arrangements, the signed SAML token is presented by itself to a relying party by the share-holder as proof of possession of valid shares, or Proof-of-Shares token.

At 404, the receiver determines if the threshold number of signcrypted SSIMS shares has been received. If the threshold number of signcrypted SSIMS shares has been received, then the tokenized original message is retrieved from signcrypted SSIMS shares and the method 400 continues to process 406. If the threshold number of signcrypted SSIMS shares has not been received, then the receiver waits to receive another signcrypted SSIMS share at 402. In some arrangements, the receiver may not know the threshold number. In those arrangements, the receiver performs processes 406 and 408 every time a new signcrypted SSIMS share is received. In those arrangements, if the threshold is not met, reconstruction fails and the receiver learns nothing about the original message, except perhaps its length. In some arrangements, each signcrypted SSIMS share includes the threshold number of shares required in an attribute of each signcrypted SSIMS shares, thereby allowing the receiver to know how many signcrypted SSIMS shares are needed.

At 406, the signcrypted SSIMS shares are unsigncrypted by using an unsigncryption algorithm associated with the signcrypted SSIMS shares. Each signcrypted SSIMS share is separately processed using the unsigncryption algorithm. The unsigncryption algorithm includes includes as input each of the signcrypted SSIMS shares, the specific shareholder's public and private key pair, the dealer's public key, and any other data. In some arrangements, the resulting output includes a pair consisting of either a symbolic value ACCEPT and a plaintext (e.g., SSIMS share) or a symbolic value REJECT and a null string. When there are any signed attributes, the recipient may also verify the digital signature.

At 408, the unsigncrypted SSIMS shares are used in a message reconstruction algorithm to retrieve the tokenized original message. The message reconstruction scheme is associated with the secret sharing scheme and related to the message sharing scheme used to generate the SSIMS shares. For example, the message reconstruction algorithm is the algorithm associated with a Shamir secret sharing scheme, a Ramp-Shamir secret sharing scheme, an additive secret sharing scheme, an information dispersal algorithm, or a computational secret sharing scheme. In some arrangements, the message reconstruction algorithm is capable of detecting whether one or more of the share-holders sent a fraudulent SSIMS share. If the threshold number of unsigncrypted SSIMS shares and the message reconstruction algorithm is successful, then the receiver has reconstructed the tokenized original message at the completion of process 408.

At 410, the tokenized original message is detokenized to retrieve the original message. This may include transmitting the tokenized original message to a TSP and receiving the detokenized original message in return. In some arrangements, the signcrypted SSIMS shares include a hash of the original message as an attribute. In those arrangements, the receiver may hash the detokenized original message and compare it to the hash of the original message in the attribute.

In arrangements where the dealer is also the receiver, the method 400 can reproduce the message while requiring no resource-expensive cryptographic reconstruction processing. The dealer generates and distributes the signcrypted SSIMS shares. The original message is tokenized and stored in a database. The SSIMS shares are also stored in a database as plaintext. Upon receipt of a signcrypted SSIMS share, the signcrypted SSIMS share is unsigncrypted and compared to the plaintext list of generated SSIMS shares. If the share matches one on the list, it is determined whether the threshold of SSIMS shares has been reached. If the threshold is met, then the dealer retrieves the tokenized original message without having to process the shares using a message reconstruction algorithm.

The embodiments described herein have been described with reference to drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit," as described herein, may include components that are distributed across one or more locations.

An exemplary system for implementing the overall system or portions of the embodiments might include a general purpose computing computers in the form of a computer, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes, and omissions may be made in the design, operating conditions and arrangement of the embodiments without departing from the scope of the present disclosure as expressed in the appended claims.

What is claimed:

1. A method, comprising:
receiving, by a shared secret provider computing system, an original message, a share-holder list, and a threshold amount;
tokenizing, by the computing system, the original message resulting in a tokenized message;
generating, by the computing system, a plurality of shares from the tokenized message using a message sharing algorithm of a secret sharing scheme;
signcrypting, by the computing system, each of the plurality of shares using a public key and a private key associated with the shared secret provider computing system and a public key of a respective one of the share-holders included in the share-holder list, resulting in a plurality of signcrypted shares;
distributing, by the computing system, the plurality of signcrypted shares to the respective ones of the share-holders according to the public key used to signcrypt the respective signcrypted share,
wherein authenticity, confidentiality, and data integrity of each of the plurality of signcrypted shares can be determined by,
verifying a signature of each of the plurality of signcrypted shares,
recovering the tokenized message from each of the plurality of signcrypted shares when the threshold amount of the distributed plurality of signcrypted shares are received from the share-holders using an unsigncryption algorithm, the unsigncryption algorithm having inputs of the signcrypted share, the share-holder's public and private key pair, the shared secret provider computing system public key;
detokenizing the tokenized message to retrieve the original message, and
determining authenticity and data integrity of each of the received plurality of signcrypted shares using the shared secret provider computing system public key, and a public/private key pair associated with each share-holder in the received the received plurality of signcrypted shares.

2. The method of claim 1, further comprising:
receiving, by the computing system, the threshold amount of the distributed plurality of signcrypted shares to the respective ones of the share-holders;
verifying, by the computing system, the signature of each of the plurality of signcrypted shares,
determining, by the computing system, authenticity, confidentiality, and data integrity of each of the plurality of signcrypted shares, wherein determining is achieved through the use of the dealer's public key and a public/private key pair associated with the respective share-holders;
unsigncrypting, by the computing system, the signcrypted share using the unsigncryption algorithm having inputs of the signcrypted share, the share-holder's public and private key pair, and the dealer's public key;
generating, by the computing system, a verification message and presenting the verification message to each of the respective ones of the share-holders; and
reconstructing, by the computing system, the tokenized message using a message reconstruction algorithm of the secret sharing scheme.

3. The method of claim 1, further comprising:
tokenizing, by the computing system prior to signcrypting each of the plurality of shares, the plurality of shares from the tokenized message resulting in a plurality of tokenized shares.

4. The method of claim 1, further comprising:
digitally signing, by the computing system prior to tokenizing the original message, the original message with a private key, wherein authenticity and data integrity of the original message can be determined based on each of the digitally signed original message and a public key of a public/private key pair including the private key.

5. The method of claim 1, further comprising:
retrieving, by the computing system, a time stamp token, the time stamp token including a hash of the original message cryptographically bound to a time stamp, the time stamp token included with the each of the plurality of shares that are signcrypted, and
wherein the time stamp token may be subsequently validated by verifying that the time stamp token was generated using the hash.

6. The method of claim 1, further comprising:
retrieving, by the computing system, a time stamp token, the time stamp token including a hash of the original message cryptographically bound to a time stamp, the time stamp token included with the original message that is tokenized, and
wherein the time stamp token may be subsequently validated by verifying that the time stamp token was generated using the hash.

7. The method of claim 1, wherein tokenizing the original message includes tokenizing a hash of the original message resulting in a tokenized message hash.

8. The method of claim 1, wherein signcrypting each of the plurality of shares further comprises including a first hash of the original message in an attribute of each of the plurality of signcrypted shares, resulting in each of the plurality of signcrypted shares including the first hash, and wherein authenticity and data integrity of each of the plurality of signcrypted shares can be determined by comparing the first hash to a second hash of the original message.

9. The method of claim 1, further comprising:
generating, by the computing system, a secret shares message event journal entry, the secret shares message event journal entry representing the generation of the plurality of shares, wherein the secret shares message event journal entry comprises information related to:
the secret sharing scheme;
the threshold amount;
the tokenized message; and
the plurality of signcrypted shares;
wherein the secret shares message event journal entry can be reviewed to determine if the generation was complete and accurate, and
wherein the generation of the secret shares message event journal entry is prompted by the generation of the plurality of signcrypted shares by the computing system.

10. The method of claim 1, wherein the secret sharing scheme is an information dispersal algorithm.

11. The method of claim 1, wherein the secret sharing scheme is at least one of a Shamir secret sharing scheme, a Ramp-Shamir secret sharing scheme, an additive secret sharing scheme, and a computational secret sharing scheme.

12. A method, comprising:
receiving, by a shared secret provider computing system, an original message, a share-holder list, and a threshold amount;
tokenizing, by the computing system, the original message resulting in a tokenized message;
generating, by the computing system, a plurality of shares from the tokenized message using a message sharing algorithm of a secret sharing scheme;
digitally signing, by the computing system, each of the plurality of shares using a private key of a public/private key pair associated with the shared secret provider computing system, resulting in a plurality of digitally signed shares; and
distributing, by the computing system, the plurality of digitally signed shares to each of the respective ones of the share-holders according to the share-holder list,
wherein authenticity and data integrity of each of the plurality of digitally signed shares can be determined by
verifying a signature of each of the plurality of digitally signed shares,
recovering the tokenized message from each of the plurality of digitally signed shares when the threshold amount of the distributed plurality of digitally signed shares are received from the share-holders by reconstructing the tokenized message using a message reconstruction algorithm of the secret sharing scheme,
detokenizing the tokenized message to retrieve the original message, and
determining authenticity and data integrity of each of the received plurality of digitally signed shares using the shared secret provider computing system public key, and a public/private key pair associated with each share-holder in the received the received plurality of digitally signed shares.

13. The method of claim 12, wherein digitally signing the message is accomplished using SignedData cryptographic message syntax to generate a SignedData message.

14. The method of claim 13, wherein a certificate attribute includes a signed attribute bound to the SignedData message, the certificate attribute including a hash of the original message.

15. The method of claim 12, further comprising:
receiving, by the computing system, the threshold amount of the distributed plurality of digitally signed shares to the respective ones of the share-holders;

verifying, by the computing system, the signature of each of the plurality of digitally signed shares;

determining, by the computing system, authenticity, confidentiality, and data integrity of each of the plurality of digitally signed shares, wherein determining is achieved through the use of the dealer's public key and a public/private key pair associated with the respective share-holders;

generating, by the computing system, a verification message and presenting the verification message to each of the respective ones of the share-holders; and reconstructing, by the computing system, the tokenized message using a message reconstruction algorithm of the secret sharing scheme.

16. The method of claim 12, further comprising:
tokenizing, by the computing system prior to digitally signing each of the plurality of shares, the plurality of shares from the tokenized message resulting in a plurality of tokenized shares.

17. The method of claim 12, further comprising:
digitally signing, by the computing system prior to tokenizing the original message, the original message with the private key, wherein authenticity and data integrity of the original message can be determined based on each of the digitally signed original message and the public key of a public/private key pair.

18. The method of claim 12, further comprising:
retrieving, by the computing system, a time stamp token, the time stamp token including a hash of the original message cryptographically bound to a time stamp, the time stamp token included with the each of the plurality of shares that are digitally signed, and
wherein the time stamp token may be subsequently validated by verifying that the time stamp token was generated using the hash.

19. The method of claim 12, further comprising:
retrieving, by the computing system, a time stamp token, the time stamp token including a hash of the original message cryptographically bound to a time stamp, the time stamp token included with the original message that is tokenized, and
wherein the time stamp token may be subsequently validated by verifying that the time stamp token was generated using the hash.

20. The method of claim 12, wherein tokenizing the original message includes tokenizing a hash of the original message resulting in a tokenized message hash.

21. The method of claim 12, wherein digitally signing each of the plurality of shares further comprises including a first hash of the original message in an attribute of each of the plurality of digitally signed shares, resulting in each of the plurality of digitally signed shares including the first hash, and wherein authenticity and data integrity of each of the plurality of digitally signed shares can be determined by comparing the first hash to a second hash of the original message.

22. The method of claim 12, further comprising:
generating, by the computing system, a secret shares message event journal entry, the secret shares message event journal entry representing the generation of the plurality of shares, wherein the secret shares message event journal entry comprises information related to:
the secret sharing scheme;
the threshold amount;
the tokenized message; and
the plurality of digitally signed shares;
wherein the secret shares message event journal entry can be reviewed to determine if the generation was complete and accurate, and
wherein the generation of the secret shares message event journal entry is prompted by the generation of the plurality of digitally signed shares by the computing system.

* * * * *